(12) United States Patent
Dimov et al.

(10) Patent No.: US 10,701,430 B2
(45) Date of Patent: Jun. 30, 2020

(54) AUTOMATED OPTIMIZATION OF SYNCHRONIZED VIDEO CONTENT

(71) Applicant: SLING MEDIA L.L.C., Foster City, CA (US)

(72) Inventors: Dmitry Dimov, Foster City, CA (US); Naga Vendata Gnana Meherkanth Vurimi, Foster City, CA (US); Padmanabha R. Rao, Palo Alto, CA (US)

(73) Assignee: SLING MEDIA L.L.C., Foster City, CA (US)

( * ) Notice: Subject to any disclaimer, the term of this patent is extended or adjusted under 35 U.S.C. 154(b) by 0 days.

(21) Appl. No.: 15/860,482

(22) Filed: Jan. 2, 2018

(65) Prior Publication Data

US 2018/0242033 A1 Aug. 23, 2018

Related U.S. Application Data

(63) Continuation-in-part of application No. 15/221,922, filed on Jul. 28, 2016, now Pat. No. 9,813,750, and a
(Continued)

(51) Int. Cl.
| | |
|---|---|
| *H04N 21/4147* | (2011.01) |
| *H04N 21/4402* | (2011.01) |
| *H04N 21/4367* | (2011.01) |
| *H04N 21/41* | (2011.01) |
| *H04N 21/4363* | (2011.01) |
| *H04N 21/45* | (2011.01) |
| *H04N 21/414* | (2011.01) |

(Continued)

(52) U.S. Cl.
CPC ..... *H04N 21/4147* (2013.01); *H04N 21/4126* (2013.01); *H04N 21/41407* (2013.01); *H04N 21/4363* (2013.01); *H04N 21/4367* (2013.01); *H04N 21/43622* (2013.01); *H04N 21/43632* (2013.01); *H04N 21/43637* (2013.01); *H04N 21/4402* (2013.01); *H04N 21/440218* (2013.01); *H04N 21/440236* (2013.01); *H04N 21/4516* (2013.01); *H04N 21/4627* (2013.01); *H04N 21/4405* (2013.01)

(58) Field of Classification Search
CPC ............... H04L 29/08072; H04L 29/06; H04L 29/08549; H04L 29/08144; G06F 17/30902

See application file for complete search history.

(56) References Cited

U.S. PATENT DOCUMENTS

2003/0028505 A1\* 2/2003 ORourke ................ G06F 7/00
2007/0073727 A1 3/2007 Klein, Jr. et al.
(Continued)

OTHER PUBLICATIONS

European Patent Office International Searching Authority, International Search Report and Written Opinion for International Application No. PCT/US2017/068706 dated Mar. 14, 2018.

*Primary Examiner* — Anthony Bantamoi
(74) *Attorney, Agent, or Firm* — Lorenz & Kopf LLP

(57) ABSTRACT

Systems, devices and methods automatically select content that is transferred from an encoder to a portable media streaming device for later playback. Security is maintained during the synchronization or transfer process to prevent unauthorized use or copying of the protected content.

16 Claims, 3 Drawing Sheets

Figure 1:
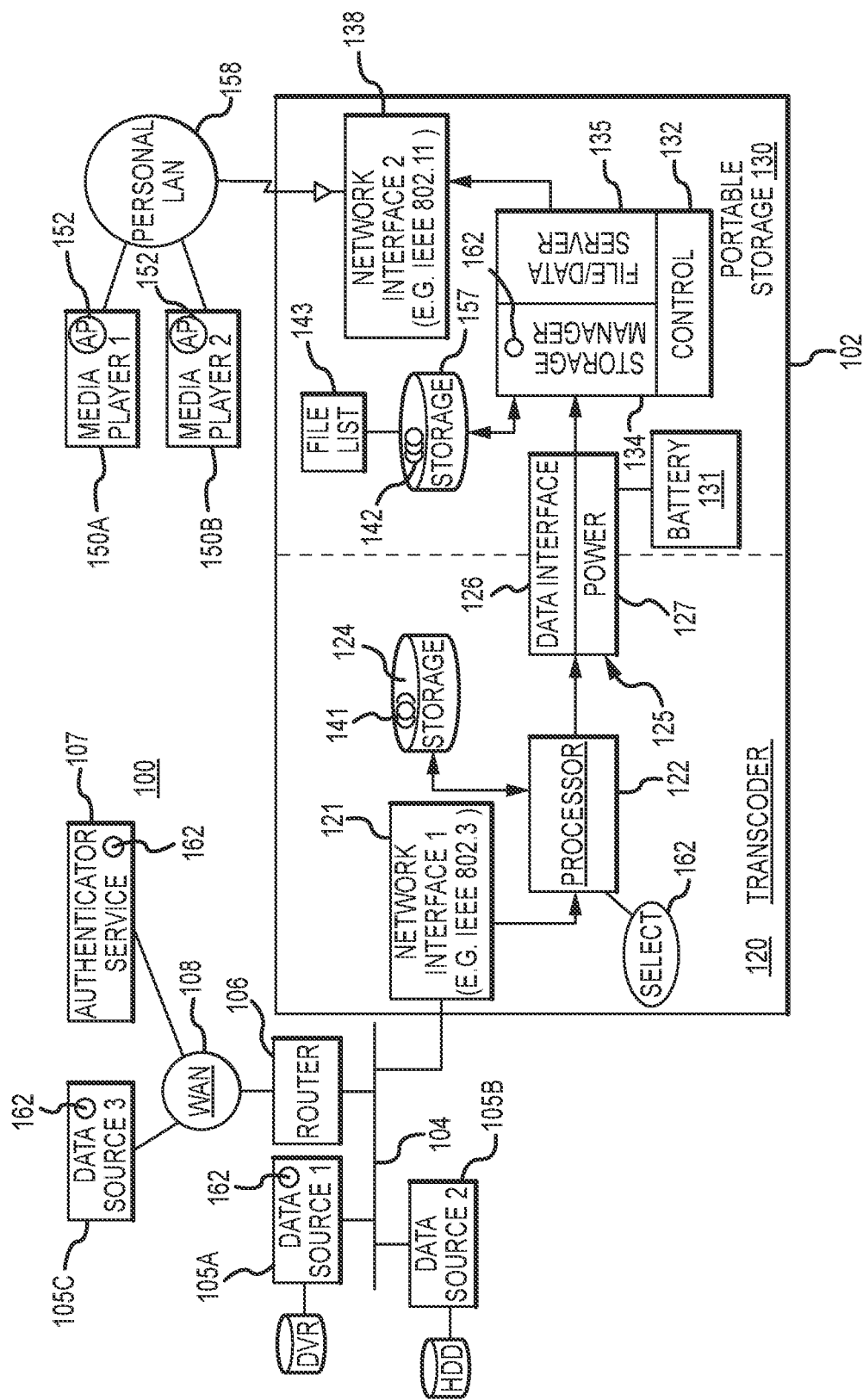

Related U.S. Application Data continuation of application No. 15/057,390, filed on Mar. 1, 2016, now Pat. No. 9,479,816, and a continuation-in-part of application No. 14/266,232, filed on Apr. 30, 2014, now Pat. No. 9,307,289.

(60) Provisional application No. 62/440,944, filed on Dec. 30, 2016.

(51) Int. Cl.
*H04N 21/436* (2011.01)
*H04N 21/4627* (2011.01)
*H04N 21/4405* (2011.01)

(56) References Cited

U.S. PATENT DOCUMENTS

| | | | |
|---|---|---|---|
| 2008/0015997 A1* | 1/2008 | Moroney | G06Q 99/00 |
| 2009/0060468 A1 | 3/2009 | Carlberg et al. | |
| 2009/0132453 A1* | 5/2009 | Hangartner | G06F 17/30 |
| 2011/0235991 A1 | 9/2011 | Luthra et al. | |
| 2011/0247038 A1* | 10/2011 | Roberts | H04N 7/26 |
| | | | 725/46 |
| 2012/0079054 A1* | 3/2012 | Moroney | H04L 29/08072 |
| | | | 709/231 |

* cited by examiner

AUTOMATED OPTIMIZATION OF SYNCHRONIZED VIDEO CONTENT

PRIORITY CLAIM

This application is a continuation-in-part of U.S. patent application Ser. No. 15/221,922 filed on Jul. 28, 2016, which is a continuation of U.S. patent application Ser. No. 15/057,390, which was filed on Mar. 1, 2016. That application is a continuation of U.S. patent application Ser. No. 14/266,232, which was filed on Apr. 30, 2014. This application also claims priority to U.S. Provisional Application Ser. No. 62/440,944 filed on Dec. 30, 2016, which is incorporated herein by reference.

TECHNICAL FIELD

The present disclosure generally relates to storage and delivery of personal video content. More particularly, the following discussion relates to devices, methods and systems that provide portable storage and wireless retrieval of personal video content. Even more particularly, the following discussion relates to systems, devices and processes to automatically select personal video content for transfer or synchronization to a portable storage device.

BACKGROUND

Television viewers are no longer confined to their home television sets. With the advent of time and place shifting techniques, viewers can now view their favorite television programs and other media content at virtually any time and from virtually any place. Personal video recorders (PVRs) and other time shifting devices are becoming increasingly ubiquitous. Additionally, many television viewers now use placeshifting devices to stream their television programs to mobile phones, tablets, personal computers, personal digital assistants, game players and/or other devices other than traditional television sets. Modern television viewers now expect to watch television at times and in places that were not previously thought possible.

As television viewing becomes increasingly mobile, various challenges can be encountered. For example, many portable media players lack sufficient storage capacity to store all of the media content that a user may want to watch. Video content can quickly consume a large amount of storage, so most users have to choose a relatively small amount of video content to carry in their phone, tablet or other personal device at any particular time. The limited storage severely restricts the choice of content that is available when the user is away from home, and it also requires relatively frequent updates to maintain a fresh store of unwatched content.

Placeshifting or other media streaming over telephone or data networks can improve the availability of content, but streaming may be very difficult in some locations (e.g., in aircraft, vehicles or other remote locations where networks are unavailable, or in hotels or other busy areas where networks are too overloaded to provide adequate bandwidth for video streaming). Even when adequate networks are available, video streams can consume a relatively large amount of bandwidth, thereby limiting the quality of the received stream and/or potentially incurring substantial cost to transfer an entire program. Moreover, it is important to protect the intellectual property rights of content owners even as the content is being viewed in non-traditional places and times.

It is therefore desirable to create systems, devices and methods for selecting a variety of streaming media content to portable devices in a convenient yet secure manner. These and other desirable features and characteristics will become apparent from the subsequent detailed description and the appended claims, taken in conjunction with the accompanying drawings and this background section.

BRIEF SUMMARY

Various exemplary embodiments provide systems, devices and methods to automatically select content that is transferred to a portable storage device for later playback, and to maintain security of the content during the synchronization or transfer process to prevent unauthorized use or copying of the protected content.

In a first example embodiment relates to a computerized process to transfer media programs from a data storage to a portable media streaming device for playback of the transferred media programs. The computerized process suitably comprises: for each of a plurality of media programs stored on the data storage, assigning a weighted value to the media program based upon weighting data; sorting the plurality of media programs according to the assigned weighted values of the programs; and while storage space remains on the media streaming device, directing the copying of those media programs of the plurality of programs that have the highest assigned weighted values from the storage device to the media streaming device. Some or all of the functions of the computerized process may be performed by a set top box or similar television receiver, or by a processor of a network server. Other embodiments could perform some of the steps (e.g., gathering data, applying the various weights to different media programs, sorting program lists) by a network service while the actual transfer of programs to the mobile streaming device is performed by a set top box, television receiver, digital video recorder, media receiver/encoder or other consumer-operated device.

These examples and other embodiments, aspects and features are described in detail below.

BRIEF DESCRIPTION OF THE DRAWING FIGURES

Figure 2:
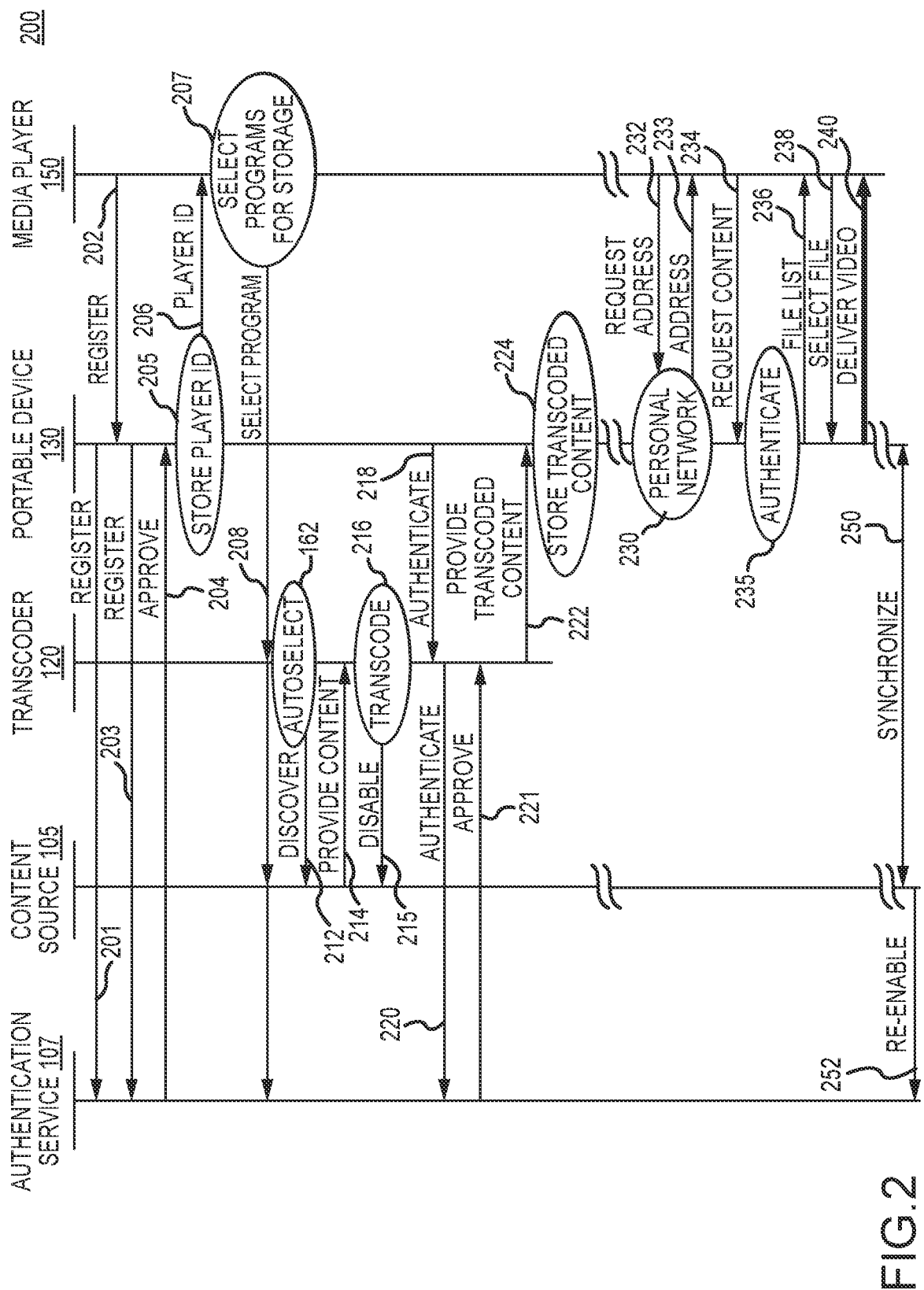
Figure 3:
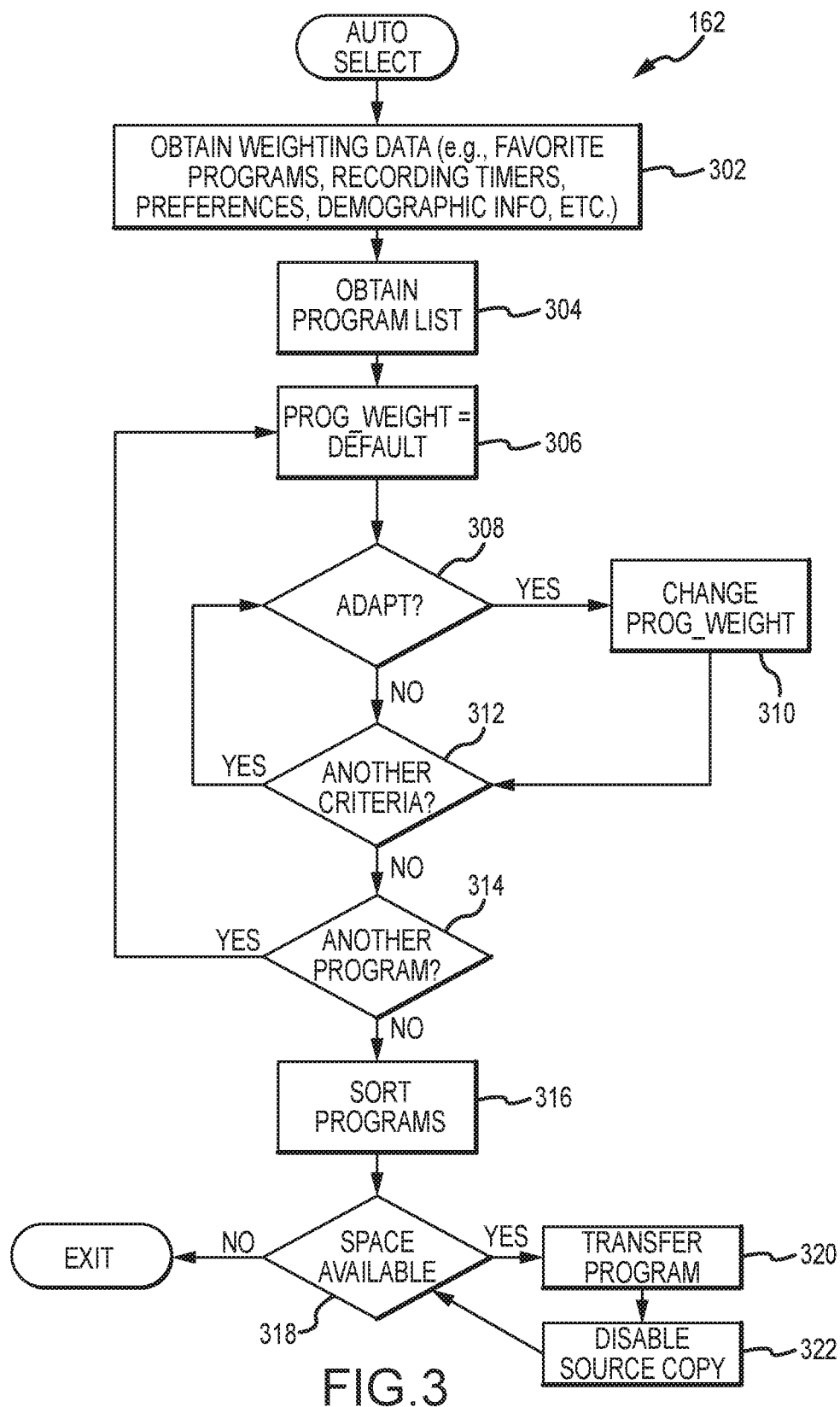

Exemplary embodiments will hereinafter be described in conjunction with the following drawing figures, wherein like numerals denote like elements, and FIG. 1 is a block diagram of an example system for providing personal video streaming with a portable storage device;

FIG. 2 is a flowchart of an example method to provide personal video streaming with a portable storage device; and FIG. 3 is a diagram showing automatic selection of content to be transferred to a portable device.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, programs stored on a digital video recorder (DVR) or other program source are automatically selected for transfer to a portable device based upon attributes of the programs, demographic information about the viewer(s), personal preferences, personal viewing history and/or other criteria as appropriate. A program selection process can be performed by a set top box (STB) that incorporates both a digital video recorder and a transcoder, for example. The process may be equivalently performed by a standalone transcoder device, by the portable device itself, by a network or other server, by a remote DVR or other content source, and/or by any other processing machinery as appropriate.

In some implementations, programs that are transferred to the portable device are deleted, or at least disabled, on the DVR or other primary program source while the programs are made available via the portable device. This prevents unauthorized copying or use of the transferred content. Programs may be re-enabled on the DVR or other source when they are removed or otherwise disabled from the portable device so that only one copy of the program remains active at any time.

According to various embodiments, a portable video delivery device includes data storage, a secure processor, and a wireless network interface that acts as an access point for a personal wireless network. Transcoded media files are stored in the data storage so that the portable device maintains a relatively large library of stored media programs that can be carried along with the user during commuting, travel and/or other activities. To playback the stored programming, other media player devices (e.g., mobile telephones, media players, video game players, tablet computers, personal computers and/or the like) use the personal wireless network to connect to the portable device and to obtain previously-transcoded content from the data storage of the device.

The content may be provided in a streaming format, as a side-loaded data file, and/or in any other format as desired. Further implementations may implement data security to prevent further duplication and unauthorized use of the programming stored on the portable device. Parental controls and other features may also be provided.

The portable device therefore provides storage of a relatively large amount of transcoded video content as well as wireless retrieval of the video content to one or more video playback devices. This wireless retrieval may allow, in some embodiments, multiple playback devices to simultaneously receive separate video streams of different stored programs. If a family was travelling together in a car, plane or other vehicle, for example, each member of the family could simultaneously obtain a personal video stream of a different program stored on the portable device, even if a streaming connection to the Internet or another network was not readily available. The portable device therefore provides many of the benefits of a network-based streaming service, but with fewer bandwidth and access constraints.

At least two variants of a portable storage device are described herein. In a first variant, the portable device includes an encoder or transcoder within a common chassis or housing as the data storage and wireless interface. The transcoder suitably receives video content from computers, television receivers, DVRs, network services and/or the like. The video content is converted into a suitable format for later streaming or side-loading prior to storage so that the converted content can later be retrieved and played back.

In a second variant, the portable device does not necessarily include transcoding hardware itself, but rather interfaces with a separate encoder or transcoder device to receive transcoded programming that can be stored and transported for later viewing. In this variant, the portable device interfaces with a transcoder provided within a set top box, television receiver, placeshifting device, digital video recorder (DVR) and/or the like, or in a standalone network transcoding device that receives video content from other sources. The properly formatted video is provided to the portable device via a suitable interface so that the transcoding hardware need not be carried along with the portable device, thereby reducing the size, complexity and power consumption of the portable device. In various embodiments, the security of the content can be preserved by authenticating the portable device and/or the users' media players to the transcoder and/or to a suitable authentication service, as desired. Other variations and equivalent embodiments could be formulated, many of which are described below.

Turning now to the drawing figures and with initial reference to FIG. 1, an example of a system 100 for processing video content for portable storage and playback suitably includes a media storage device 102 that receives video content, stores transcoded content in a data storage 137, and provides a personal wireless network 158 via a network interface 138. Device 102 may interact with an authentication service 107 on network 108 or elsewhere to maintain the security of system 100, as described more fully below.

In the example illustrated in FIG. 1, device 102 suitably includes a transcoder portion 120 and a storage portion 130. As noted above, some variants of device 102 may include a transcoder 122 that transcodes received video content for subsequent streaming and/or file transfer ("side loading") to one or more media players 150A-B via personal network 158. Other variants may provide the functions of transcoder portion 120 within a separate device, such as a television receiver, STB, placeshifting device, DVR, standalone network transcoder device and/or the like.

The storage portion 130 of portable device 102 suitably includes a processor 132, data storage 137, and a wireless network interface 138. Data storage 137 may be any sort of solid state, magnetic, optical or other data storage capable of storing transcoded video programs 142. Data storage 137 may be implemented using one or more flash memories, SDRAMs, hard disk drives and/or the like, to provide just a few examples. Some embodiments may incorporate removable storage, such as microSD, miniSD, or other memory cards, as desired.

Wireless network interface 138 suitably includes an antenna and other appropriate hardware and software to host a personal local area network 158. In various embodiments, personal network 158 is an IEEE 802.11 ("Wi-Fi") network that can be readily joined by any number of conventional computers, phones, tablets, media players and/or other devices. The network may be password protected, encrypted and/or otherwise secured to protect against unauthorized access. In various embodiments, personal LAN 158 is primarily used to provide video content from device 102 to client devices 150A-B. It may not be necessary that LAN 158 have access to the Internet or any external networks to support video transfers; indeed, device 102 may be of convenient use in vehicles or in other settings where WAN access might not be readily available.

Processor 132 provides a storage manager function 134, a data server function 135, and control functions as appropriate. In various embodiments, each function 134 and 135 is implemented in software or firmware stored in memory and executed by processor 132. Various embodiments implement processor 132 and its various functions 134, 135 using a system-on-a-chip (SOC) processor that includes appropriate processing circuitry, memory and input/output features as needed. Processor 132 may be a secure processor that includes encrypted memory portions (e.g., using AES-128 or similar encryption) to protect against hacking or reverse engineering. Other embodiments may provide equivalent functions in a conventional microprocessor, microcontroller, digital signal processor, ASIC, programmable logic array and/or other hardware, as desired.

Electric power for processor 132, storage 137 and network interface 138 may be provided in any manner. In various embodiments, a battery 131 is provided to facilitate mobile operation, such as in vehicles, while commuting and/or in other settings where electricity may not be conveniently available. Other embodiments may receive electrical power through a conventional power source (e.g., a power supply that receives electricity from a conventional AC outlet or the like).

In the embodiment shown in FIG. 1, the portable storage portion 130 receives electrical power through a detachable interface 125 to transcoder portion 120. Interface 125 may be, for example, a universal serial bus (USB) connector, LIGHTNING connector, or the like that provides interfaces 126 and 127 for providing data and electricity (respectively) to storage portion 130, as appropriate. In this example, electrical power received via interface 127 could recharge battery 131 as needed, and/or supplement power supplied by battery 131. Interface 127 could also supply electrical power from an external power source such as an electrical outlet, a USB battery, a USB slot of a personal computer or the like if transcoder portion 120 is not available, as desired. As noted above, some implementations may provide transcode portion 120 and storage portion 130 in a common unit; in such embodiments, there would be no need to physically separate portions 120 and 130 from each other, so interface 125 may not be needed. Alternatively interface 125 may be a conventional data bus that transfers data from transcoder 122 for storage in portion 130, but that may not supply electrical power between portions 120 and 130.

Transcoder portion 120 suitably includes a transcoding processor 122 and a network interface 121 to a home or other local area network 104. In the example shown in FIG. 1, interface 121 is an IEEE 802.3 interface to a conventional ETHERNET network; equivalent embodiments may use other interfaces, including WI-FI or other wireless interfaces as desired. In some implementations, interface 121 may be eliminated or combined with wireless interface 138 in any manner.

Transcoding processor 122 is any processing hardware and software capable of transcoding media programming into a digital format that can be delivered via personal network 158. Different embodiments may support any number of different formats, including any formats for streaming or side-loading, as desired. In various embodiments, transcoding techniques generally used for placeshifting could be applied. Unlike placeshifting techniques that adapt the transcoding of the media stream in response to then-current network conditions, however, suitable default transcoding parameters may be selected in many settings to reflect that network 158 is more predictable that most connections that support traditional placeshifting, and to reflect that transcoding occurs prior to streaming in this instance. Transcoding may nevertheless involve converting the received media content from formats typically associated with DBS, cable, terrestrial broadcasts (e.g., MPEG) and/or formats typically used for storage in a DVR or the like into a format that is suitable for streaming on a digital network. Such conversion may involve translation from one digital encoding format to another, as well as any appropriate compression and/or encryption to preserve the security of the underlying content. Other actions may be additionally or alternately performed as part of the transcoding function.

Various embodiments of transcoder 120 may include storage 124 for storing pre-encoded video programs 141 and/or transcoded video programs 142 as desired. Programming content to be transcoded may be manually or automatically obtained from any number of content sources 105A-C that are accessible via interface 121. In the example of FIG. 1, content source 105A is a television receiver with a DVR that stores programs recorded by the user, and content source 105B is a personal computer with a hard drive that includes stored media programs. Both content sources 105A-B may execute software applications that interact with transcoding portion 120 to manually and/or automatically transfer content over network 104 for transcoding. Content may also be received from a video-on-demand (VOD), remote storage digital video recorder (RSDVR), or other source 105C accessible via the Internet or another wide area network 108. In other embodiments, storage 124 could represent a DVR or other program source 105. A set top box, for example, could include a DVR, transcoder, television receiver and appropriate interfaces to portable device 130 within a common chassis or housing, as described above.

Un-transcoded programs 141 may be stored in storage 124 prior to transcoding for transfer to the remote device 130. After transcoding, the transcoded video content 142 may be temporarily stored in storage 124 if storage portion 130 is detached or otherwise not immediately available. When storage portion 130 is in contact with transcoder portion 120, transcoded media content is transferred via interface 125 to transcoder portion for storage in data storage 137. Copy protection, digital rights management (DRM) or other security features could be executed when the storage portion 130 is reconnected to the transcoder device 120 so that programming can be re-synchronized. Any disabled programs on DVR 124 or another program source 105 may be re-activated, for example, if the copies previously transferred to portable device 130 are disabled or deleted.

In various embodiments, processor 122 executes an auto-select process 162 to automatically select some or all of the programs that are transferred to the portable device. In addition to (or in place of) programs manually selected by the user, process 162 allows any remaining storage space to be filled with other programs that are most likely to be of interest to the user. Various embodiments could consider viewer demographics (e.g., age, gender, etc.), viewing history (e.g., favorite programs, programs previously viewed on the portable device 130, etc.), and/or any additional criteria as appropriate to select those programs for transfer to the portable device 130. Process 162 may be equivalently performed on processing circuitry associated with the portable device 130 itself, on any other program source 105, on authentication service 107 and/or on any other locally-available or remote processors, including any sort of cloud processing resources. Additional detail about an example process 162 is provided below.

The storage manager 134 manages the transcoded programming 142 stored in storage 137. In various embodiments, storage manager 134 maintains a list 143 of all of the stored programs 142. This list 143 can be supplied to media player client applications 152 to provide a directory of programs available for retrieval or streaming via network 158, as described more fully below. List 143 may also be used to ensure DRM or copyright compliance, as desired. To that end, list 143 may be supplied to transcoder 120 when the portable device 130 is reconnected so that any programs on the list 143 that were previously disabled on DVR 124 or other storage may be reactivated, as desired.

In some implementations, a secure processor 132 of storage portion 130 authenticates with transcoder 122 and/or authentication service 107 on a repeating basis (e.g., daily, monthly, etc.) to maintain the integrity of system 100. Client applications 152 executing on media players 150A-B may also authenticate with processor 132, transcoder 122 and/or authentication service 107, as described more fully below.

In operation, then, storage manager 134 directs the storage of transcoded program files 142 on storage 137 and data server 135 provides access to stored files 142 via network 158. In various embodiments, data server 135 is based upon conventional hypertext transport protocol (HTTP) constructs similar to a conventional web server. This allows client applications 152 to request file list 143, to select programs available from the list, and to receive streams or files that include the requested programming via the personal network 158.

The security and integrity of system 100 may be protected in any number of different ways. As noted above, processor 132 may include encrypted memory regions to protect against reverse engineering and discovery of encryption keys or other secure data. Transcoded content 143 may be secured with digital rights management (DRM) or persistent rights management (PRM) such as the MEDIAACCESS PRM product available from Nagra Kudelski of Cheseaux-sur-Lausanne, Switzerland, although other cryptography, DRM or PRM products could be used in any number of equivalent embodiments. Further embodiments could require the registration of client applications 152, users and/or client devices 150A-B with transcoder 122 and/or authentication service 107 prior to use. Storage portion 130 could disable access to programs 142 after some period of time (e.g., several weeks to a month, as desired) unless the storage portion 130 re-authenticates with transcoder 122 and/or authorization service 107 to prevent portion 130 from becoming a medium of content transfer. Further, access to the personal network 158 may be limited to an appropriate number of simultaneous users, each of whom may register with a password to prevent unfettered access to content 142 on storage 137. Other embodiments may provide alternate or additional features, as desired.

Referring now to FIG. 2, an example process 200 to securely deliver transcoded media files to one or more media player clients suitably includes the broad steps of selecting media content (function 207 and/or 162), obtaining and transcoding the selected content (functions 214 and 216), storing the transcoded media files 142 in storage 137 (function 224), providing a personal network 158 from the portable storage device 130 (function 230), and securely providing requested program content to media players 150 via personal network 158 (function 240). Content may be later synchronized (function 250) with the content source 105 to preserve DRM or other usage rights. These basic functions may be supplemented or modified as desired to improve security, functionality and convenience to the user, or for any other purpose.

As noted above, many embodiments will restrict access to stored content 142 by ensuring that media player clients 150 are authorized to receive content. To that end, portable device 130 and/or each media player 150 receiving content 142 from device 130 will typically register with an authentication authority 107 (functions 201, 202). In various embodiments, the authentication authority 107 could be an Internet or other network service operated by a media content provider or other service provider. In other embodiments, however, the authentication authority 107 may be incorporated into a set top box, network device and/or other content source 105, provided that the device providing the authority 107 is built with adequately secure hardware and software to prevent unauthorized access or tampering. In the illustrated embodiment, media player 150 registers with the portable device 130 (function 202), which then forwards the registration request to the authentication authority 107 (function 203) for approval. In some implementations, registrations 201, 203 occur when the portable device 130 is connected to the transcoding device 120; in other embodiments, storage device 130 contacts the authentication authority 107 directly, as desired.

Authentication authority 107 verifies that the user, media player 150 and/or storage device 130 are approved to receive content 142. If so, the authority 107 issues an approval 204 that can be stored in secure storage of the portable device 130 (function 205). Portable device 130 will typically store a copy of a player ID or other credential that is uniquely associated with each approved media player 150, and will forward a copy of the credential to the player itself for use in subsequent authentication (function 206). Credential 211 may include digital cryptographic data generated by the portable device 130, by transcoder 120, by media player 150 itself, by authentication service 107, and/or by any combination of these sources. Credentials assigned to storage device 130 and/or media players 150 may be renewed on any temporal basis (e.g., weekly, monthly, etc.) if desired to prevent improper use of content stored on storage device 130. Re-authentication of storage device 130 and/or media players 150 with authorization service 107 from time-to-time can prevent unauthorized long-term transfers of content stored on the device 130, if desired.

As noted above, content to be stored on portable device 130 may be manually and/or automatically selected in any manner. In various embodiments, one or more users manually select content for storage on device 130 using an authenticated media player 150 (function 207). In such embodiments, content available from one or more program sources 105 (e.g., a DVR on storage 124) may be listed for the user, who is then able to select specific contents for transcoding and storage on device 130. The program list may be provided via an electronic program guide (EPG) or similar listing available from a network service, from one or more content sources 105, and/or from any other source. In various embodiments, a client application executing on media player 150 displays program guide data and other listings of available programming for placeshifting, recording, viewing or other functions. The user is allowed to select one or more programs and, using any suitable interface features, to direct that the selected program be transcoded and stored on the portable device 130 (function 208). In such embodiments, a network service (e.g., service 107 or another service on network 108) receives the program selection from media player 150 and directs content source 105 to deliver the selected program to transcoder 120 for storage on device 130. In other embodiments, the media player 150 communicates directly with a set top box, DVR or other content source 105 to select and retrieve programs for transcoding and storage.

Transcoder 120 therefore discovers and obtains media content from one or more content sources 105 using any appropriate techniques (function 212). Rather than receiving programs selected by a user, for example, some implementations could alternately or additionally allow transcoder 120 to automatically communicate with the various content sources 105 to automatically select (function 162) and transfer some or all of the programming available from that device (function 214). That is, the transcoder 120 could use any process 162 or algorithm to automatically select content to store on device 130, as desired. The content discovery and delivery process may be automated in any manner and/or users may manually direct the transfer of programs to for transcoding and storage in any other manner, as desired. Although FIG. 2 illustrates process 162 as being performed by the transcoder device 120, process 162 could be equivalently performed by content source 105, authentication service 107, portable device 130, media player 150, a network or cloud server, and/or any other hardware that may be available. Additional detail about an example process 162 to automatically select content for transfer to the portable device 130 is described below.

Transcoding of received media content (function 216) suitably involves placing the content in an appropriate digital format for storage and retrieval as described herein. In various embodiments, transcoding may involve compressing broadcast or downloaded video data, converting to video formats that are compatible with media players 150 and/or personal network 158, encrypting the video prior to storage, and/or other functions as desired. In various embodiments, the source copy of the program stored on program source 105 may be disabled (function 215) while the transcoded copy is active. This prevents multiple active copies of the same content, which could otherwise contravene DRM or other rights, as appropriate. Disabling the content may involve deleting the unused copy entirely in some embodiments, although other embodiments may simply retain the data in storage without allowing the user to access the program while the other copy is active.

In some embodiments, storage device 130 authenticates with the transcoder 120 prior to receiving the transcoded content 142 (function 218). This authentication may involve providing a digital code or other identifier as desired. Transcoder 120 may confirm the authorization with authentication system 107, if desired (function 220, 221). Authentication may not be required prior to every video transfer, but regular re-authentication of the portable device 130 can prevent the device 130 from becoming a medium of content transfer in some embodiments.

If the authentication is successful, then transcoder 120 provides the transcoded video content to portable device 160 (function 222). Transcoder 120 also provides any cryptographic keys or other data necessary for processing DRM/PRM of the transcoded programs 142. Keys may be stored in a secure memory associated with processor 132, as appropriate. Transcoded programs 142 are placed in storage 137 for transport and subsequent retrieval, as appropriate (function 224).

When the portable device 130 is in use, it suitably provides its own Wi-Fi zone or other appropriate personal wireless network 158, as described above (function 230). In various embodiments, portable device 130 acts as a wireless access point (WAP) or other host that serves data to one or more media players 150 via a private wireless network 158 that is restricted to authorized media players 150. To that end, media players 150 suitably request access to the personal network 158 (function 232), and portable device 130 provides network addresses or other credentials necessary for participation in personal network 158 (function 233). In various embodiments, media players 150 provide passwords or other credentials prior to receiving access to the private network 158. Credentials may include the player ID previously received from the portable device 130 during the earlier registration. In such embodiments, portable device 130 may compare the received credentials with the stored credentials to perform an off-line authentication of the media player 150 even when authentication server 107 is not available (function 235). Portable device 130 may restrict the total number of media players 150 that have simultaneous access to the personal network 158, as desired, to prohibit mis-use of content stored on the device 130 or for other purposes. Portable device 130 may also reject media players 150 that have outdated credentials. By requiring media players 150 to refresh their credentials with the authentication authority 107 from time to time, additional forms of mis-use can be prevented.

The media player 150 requests the content list 143 (function 234) that describes the transcoded programs 142 held in storage 137 (function 236). The user appropriately selects a program 142 to view (function 238), and the selected program is provided to the media player 150 over personal network 258 in an appropriate manner (function 240). As noted above, different embodiments could deliver the selected program 142 as a media stream, as a side-loaded file transfer, or in any other manner. As noted above, a portable device 130 could readily provide separate video feeds to multiple simultaneous users. This could allow, for example, multiple family members to simultaneously watch separate programs on their own media players 150.

In various embodiments, the portable device 130 synchronizes with the transcoder device 120 (function 250) on any regular, irregular or user-driven basis. This synchronization 250 may occur after the portable device is returned to the transcoder device 120 for content updates, power charge, and/or the like after being used apart from the transcoder 120 for some time. Synchronization may allow any played or deleted programs on portable device 130 to be re-activated on content source 105, as desired (function 252), so long as only one copy of the program remains active at any time (e.g., any copies remaining on the portable device 130 will be deleted or disabled when the original copy on content source 105 is re-activated). Synchronization 250 may also allow new content to be selected (functions 162, 207) and transferred to the portable device 130, as desired.

The various security mechanisms shown in FIG. 2 can be used to preserve the integrity of transcoded programs delivered to the media player. In contrast to conventional file sharing systems in which media files are simply stored without restriction, various embodiments use digital credentials to securely provide stored programs only to those media players that have been previously authenticated and approved to receive such data. Additional embodiments could further enhance the security of the system by requiring the portable device 130 and/or media players 150 to periodically renew their credentials, by limiting the number of media players 150 that are able to access the storage device, to limit the number of simultaneous connections to private network 158, and/or by taking other actions as appropriate. Through the use of digital cryptography and/or other access controls, content stored on device 130 may be limited to playback on one or more media players 150, or certain programs may be associated with certain players while other programs remain accessible by other players 150. Further, the storage device 130 could be uniquely associated with a particular transcoder 120 and/or data source 105, as desired. Still other embodiments could require that the storage device 130 be interfaced with transcoding device 120 and/or content source 105 while authentication of the storage device 130 and/or one or more media players 150 takes place.

Additional or other constraints may be imposed to further enhance the security of the system as desired.

Although FIG. 2 and the discussion herein often refers to the "transcoding portion 120" and the "storage portion 130" as separate devices, other embodiments could combine the transcoder and storage portions within a common housing or chassis to make a portable transcoder device with delivery capabilities, as noted at the outset. Other embodiments will implement the storage function 130 in a separate device that cooperates with an transcoder 122 provided in a set top box, television receiver, placeshifting device, video recording device, standalone network transcoder or other program source 105, or any other device as appropriate. Many different variations could be formulated in a wide array of equivalent embodiments.

Turning now to FIG. 3, an example process 162 to automatically select programs or other content to be transferred to the portable device 130 suitably includes the broad steps of gathering data that is used to weight the various programs that are available (function 302), gathering programs to be considered (function 304), applying appropriate criteria to adapt the weights of the various programs (functions 308, 310, 312), and sorting the weighted results (function 316). The higher-weighted programs can then be transferred to the portable device 130 (function 320). Any DRM-protected content may also be disabled on the original content source 105, as desired. As noted above, process 162 may be stored in memory and executed by processor 122 of transcode module 120, especially if module 120 also has access to a local DVR or other program source 105. Equivalent embodiments, however, could store and execute the auto-selection process 162 on any other computing hardware, including any network or cloud-type resources that may be available.

Various embodiments could consider any numbers and types of criteria to select programs. Typically, the various criteria will be used to apply weighted values to each of the available programs so that programs can be promoted or suppressed based upon their application to the various criteria. To that end, process 162 obtains (or otherwise receives) data associated with the relevant criteria (function 302). Such criteria could include, without limitation, preference data provided by the expected viewer(s); demographic information (age, gender, geographic region, income level, etc.) about the expected viewer(s); viewing or recording histories of expected viewer(s); and/or the like. In various embodiments, viewing history data is collected for one or more viewers by tracking what programs the viewer watches, and/or the conditions in which the viewing occurs. If a viewer regularly watches a particular program at a particular time or day, for example, then it may be preferable to transfer that program to a portable device 130 if that day and time is approaching. Some viewers may watch certain types of programs (e.g., movies or longer shows) from the portable device that are not typically watched on regular television or placeshifting. This can be identified so that the viewer is more likely to receive programs that are of greatest interest at the time and place of viewing. Other information that may be obtained and processed could include recording timer information (e.g., programs that are affirmatively recorded by the viewer may be more likely to be of interest than programs that are auto-recorded). Function 302 may also involve receiving information about the different programs (e.g., popularity, applicability to different viewing profiles, etc.) as desired.

In some embodiments, content is auto-selected based upon compliance with a viewer profile. If the expected viewer is a child, for example, then it may be very desirable to ensure that the portable device 130 has at least some available children's programming. Similarly, if the expected viewer is a sports fan, it may be desirable to place sports news, classic sports content or actual sporting events on the portable device. Any number of different viewer profiles can be created, and viewers can be matched with different profiles based upon manually-entered information about the viewer, demographic information about the viewer, information obtained from a login account, information gleaned from past viewing or recording habits (including viewing on different devices), and/or any other information that may be available.

Lists of available program content may be obtained in any manner (function 304). In various embodiments, the available programs may be currently stored on a DVR or other program source 105. If the transcoder device 120 includes its own DVR, program lists may be readily available. Program lists from remote program sources 105 may be obtained through network requests/responses, or otherwise as desired. In some embodiments, certain programs may be excluded from the program list due to DRM or other licensing restrictions, due to the viewer's desired to maintain the primary copy on the program source 105 (e.g., the viewer prefers to watch the program on a regular television rather than from the portable device), due to privacy or adult controls, and/or due to other factors. Programs excluded from the list will not be evaluated for transfer, as appropriate.

In the example shown in FIG. 3, each program in the list is assigned a weight based upon relevant criteria. To that end, each program may be initially assigned a neutral weight value ("Prog_Weight=Default"), as shown in function 306. This default value may be increased and/or decreased (function 310) as the program is evaluated against any number of different criteria (function 308). If the program was affirmatively recorded by the viewer, for example, function 310 may increase the weight, whereas auto-recorded content that has never been watched may be decremented. The various weights applied in function 310 may vary widely from embodiment to embodiment and from criteria to criteria. If a program has been previously viewed from the portable device 130, for example, than a later episode of the same program may have a relatively high weight adjustment relative to a program that has not been similarly viewed. Programs that were previously manually transferred by the viewer (or subsequent episodes of the same program) may be similarly prioritized over other programs. Other weights may be assigned or adjusted based upon compliance with demographic information (e.g., programs known to appeal to viewers of similar demographics), express viewer preferences for or against certain types of programs, or the like. Any number of different criteria could be considered in a wide array of alternate embodiments (function 312).

Ideally, all of the available programs will be evaluated against the various criteria until weighted values are assigned to all of the programs (function 314). When the data has been assigned and applied, then the program list is sorted based upon the weighted values to identify those programs that are most likely to be of interest to the user(s) of the portable device 130 (function 316).

Programs are then transcoded and/or transferred to the portable device as space allows (function 318). In various embodiments, any programs that are manually selected by the viewer (e.g., in function 207) may be transferred first, with any remaining space "auto-filled" by process 162. To that end, the amount of space that is available for auto-selected programming may vary from time to time, even for the same portable device. Typically, device 130 will report its available storage space to the transcoding device, or at least will provide an indication when the storage is nearly full.

Programs are then transferred in any manner (function 320). In various embodiments, programs are obtained from a local or remote program source 105 and transcoded as appropriate. Transcoded programs may be disabled from further use on the primary program source 105 as needed (function 322) by sending secure messages to the program source, or by performing other relevant actions (e.g., deleting the program, disabling user access to the inactive program, etc.). Transfer can continue until the portable device 130 is out of storage, until a pre-determined number of programs have been transferred, until a predetermined amount of data has been transferred, until directed to stop by a user or other process, or until any other conditions warrant.

After the portable device 130 is loaded with content, it may be removed from the transcoder device 120 and used as desired. When the device 130 is returned, then resynchronization may occur (function 250 above) so that any inactive programs on source 105 are re-activated, and so that further usage data may be transferred for use in subsequent processes 162. As the portable device 130 is used, the usage data can enhance future processes 162 by providing more content that is likely to be of interest to the viewer, as appropriate.

The term "exemplary" is used herein to represent one example, instance or illustration that may have any number of equivalent alternatives. Any implementation described herein as "exemplary" is not necessarily to be construed as preferred or advantageous over other possible implementations. While several example embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A computerized process executable by a computing device to transfer media programs from a data storage to a portable media streaming device in communication with the computing device for playback of the transferred media programs by the portable media streaming device, the computerized process comprising:

for each of a plurality of media programs stored on the data storage, the computing device assigning a weighted value to the media program based upon weighting data;

sorting the plurality of media programs by the computing device according to the assigned weighted values of the programs; and for each of those media programs of the plurality of programs that have the highest assigned weighted values, the computing device transcoding and copying the media program from the data storage to the media streaming device and disabling playback of the media program from the data storage while the same media program is available via the portable media streaming device, wherein playback of the media program from the data storage is re-enabled upon subsequent communication with the portable media streaming device, and wherein programs having lower assigned weighted values are not transcoded and copied to the media streaming device so that playback of the programs having lower assigned weighted values from the data storage remains enabled.

2. The computerized process of claim 1 further comprising the computing device re-enabling the disabled copies of the transferred media programs on the data storage when the transferred media programs are removed from the media streaming device.

3. The computerized process of claim 1 wherein the weighting data comprises demographic information about the viewer of the programs.

4. The computerized process of claim 1 wherein the weighting data comprises personal preferences about a viewer of the media programs.

5. The computerized process of claim 1 wherein the weighting data attributes of the media programs themselves.

6. The computerized process of claim 1 wherein the weighting data popularities of the media programs, and wherein the weighted values reflect relative popularities of the media programs.

7. The computerized process of claim 1 wherein the weighting data comprises indicia of whether recording timers are set the media programs, and wherein media programs having recording timers set have higher weighted values than media programs that do not have recording timers set.

8. The computerized process of claim 1, wherein the computing device is a television receiver device that directly interfaces with the media streaming device.

9. The computerized process of claim 8 wherein the computerized process is performed whenever the media streaming device is interfaced with the television receiver device.

10. The computerized process of claim 1, wherein the computing device is a network server system that communicates with a television receiver device that directly interfaces with the media streaming device.

11. The computerized process of claim 1 wherein the copying of media programs from the storage device to the media streaming device continues until storage space available on the media streaming device is full.

12. The computerized process of claim 1 wherein, upon the subsequent communication with the portable media streaming device, viewing of the media programs stored on the portable media streaming device is disabled.

13. A set top box device comprising:

a digital video recorder (DVR) configured to store a plurality of media programs;

a transcoder;

an interface to transfer programs from the digital video recorder to a portable device; and a processor configured to automatically select the programs that are transferred from the digital video recorder to the portable device, wherein the processor is further configured to assign weighted values to each of the media programs stored on the DVR based upon weighting data, to sort the plurality of media programs according to the assigned weighted values of the programs, and to transcode and copy those media programs that have the highest assigned weighted values from the digital video recorder to the portable device for playback of the media programs by the portable device, wherein the media programs stored on the digital video recorder are disabled for presentation by the set top box while the same programs are available via the portable device, wherein playback of the media program from the digital video recorder is re-enabled upon subsequent communication with the portable device and wherein programs having lower assigned weighted values are not transcoded and copied to the media streaming device so that playback of the programs having lower assigned weighted values from the data storage remains enabled.

14. The set top box device of claim 13 wherein programs stored on the digital video recorder are re-enabled when they are subsequently disabled from the portable device.

15. The set top box device of claim 13 wherein the processor is further configured to synchronize programs between the digital video recorder and the portable device.

16. The set top box device of claim 13 wherein, upon the subsequent communication with the portable device, viewing of the media programs stored on the portable device is disabled.

* * * * *